E. M. HOLME.
ELECTRICALLY OPERATED CRANE OR OTHER RAISING AND LOWERING MACHINERY.
APPLICATION FILED MAR. 23, 1915.

1,326,732.

Patented Dec. 30, 1919
6 SHEETS—SHEET 1.

*Inventor*
E. M. Holme.
by *[signature]* Atty.

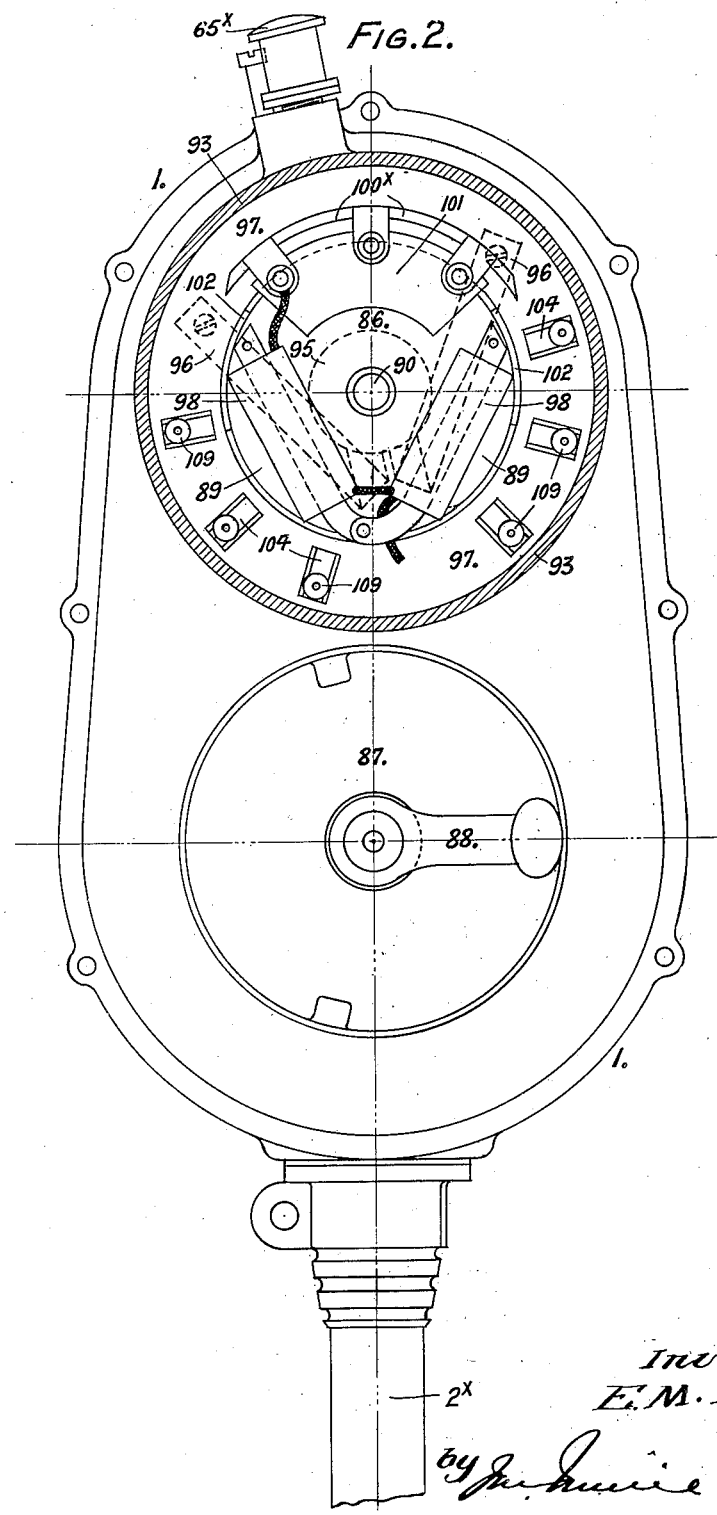

E. M. HOLME.
ELECTRICALLY OPERATED CRANE OR OTHER RAISING AND LOWERING MACHINERY.
APPLICATION FILED MAR. 23, 1915.
1,326,732.
Patented Dec. 30, 1919.
6 SHEETS—SHEET 3.
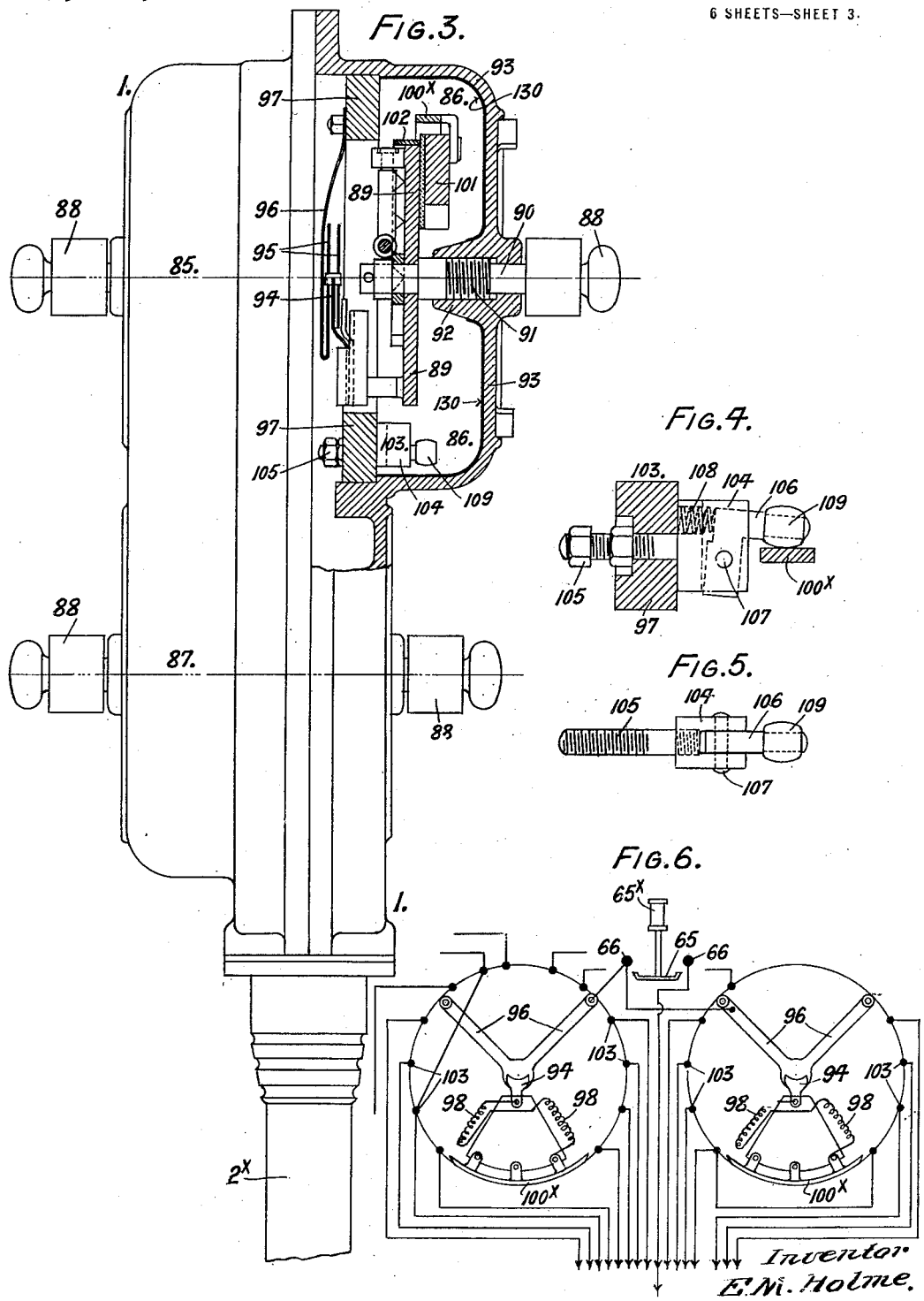

E. M. HOLME.
ELECTRICALLY OPERATED CRANE OR OTHER RAISING AND LOWERING MACHINERY.
APPLICATION FILED MAR. 23, 1915.

1,326,732.

Patented Dec. 30, 1919.

Inventor
E. M. Holme.

by [signature] Atty.

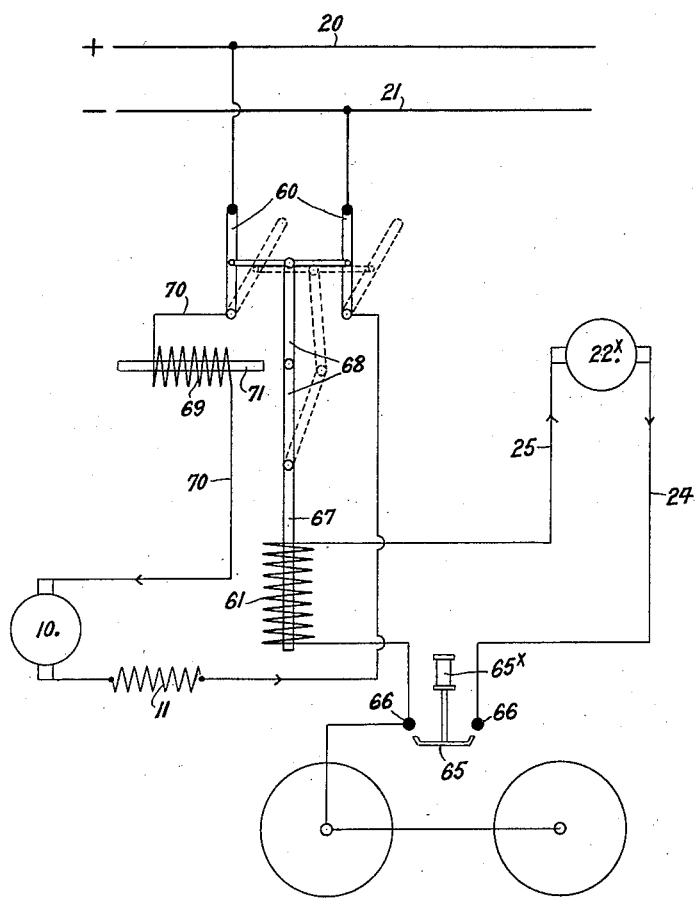

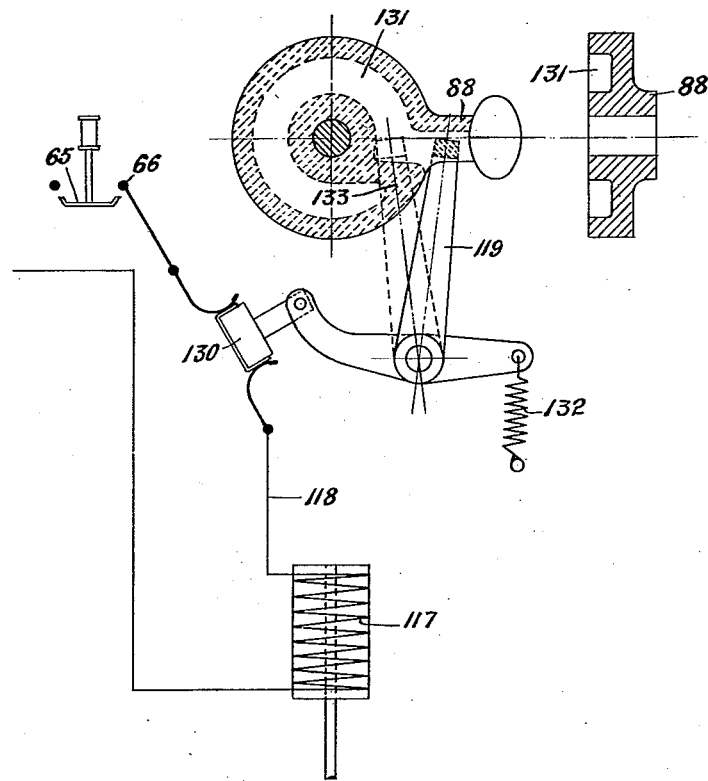

UNITED STATES PATENT OFFICE.

EDWARD MORTEN HOLME, OF MANCHESTER, ENGLAND.

ELECTRICALLY-OPERATED CRANE OR OTHER RAISING AND LOWERING MACHINERY.

1,326,732. Specification of Letters Patent. Patented Dec. 30, 1919.

Application filed March 23, 1915. Serial No. 16,519.

*To all whom it may concern:*

Be it known that I, EDWARD MORTEN HOLME, a subject of the King of Great Britain and Ireland, residing at Manchester, in the county of Lancaster, England, have invented new and useful Improvements in or Connected with Electrically-Operated Cranes or other Raising and Lowering Machinery, of which the following is a specification.

This invention has reference to electrically worked cranes, or raising and lowering machinery, such as are used for unloading and loading or putting goods into and off ships or vessels, raising and lowering the goods from and into them, and generally dealing with goods or articles at docks, harbors, or at works and buildings of various kinds, and other places; and one of the chief objects of the invention is to provide an easily controlled and operated gear of relatively simple and inexpensive construction or character, furnished with a manually operated portable control means, which is complete in itself, and adapted to meet all the varied requirements and conditions which exist in handling goods, and the machinery therefor, so that it is complete functionally and constructively in all respects, and at the same time, in character, is inexpensive, simple, and easily worked.

The primary object of machines for raising and lowering, and generally handling or manipulating goods, of the kind referred to, is to enable the person in charge of the crane or machinery to better and more conveniently do the work, especially where the goods have to be taken out and put into the holds of ships, or manipulated under similar circumstances, and also to enable this one person who works the machinery, to superintend and do the whole work himself, rendering it thereby unnecessary for employing another person or other persons to watch the goods in movement and indicate to the person who controls the working of the machinery, the various operations and functions to be performed.

With a portable and light hand operated controller of the kind referred to, which can be readily moved from place to place, or may be swung over the shoulders and carried by the operator himself, and connected up by a flexible or jointed cable or connections, with various functionary parts of the appliance or electrical mechanisms, it will be readily seen the operator can place himself at any time, at will, in the most convenient and advantageous position or spot in relation to the goods being handled, either at or near their places of removal or at or near their place of storage, or deposit.

The complete installation of electrical appliances and arrangements is illustrated diagrammatically in Figure 1; and the invention will be described first, mainly in connection with this figure.

The hand operated portable controlling apparatus is illustrated in Figs. 2 to 6; Figs. 2 and 3 being front and side views partly in section; Figs. 4 and 5 views showing details; and Fig. 6 is a diagram of the instrument.

Fig. 11 is a diagrammatic view of the switch controlling the current from the main conductors.

Fig. 12 is a diagrammatic view of the auxiliary handle and connections.

Fig. 13 is a section of the auxiliary handle.

Figure 7:
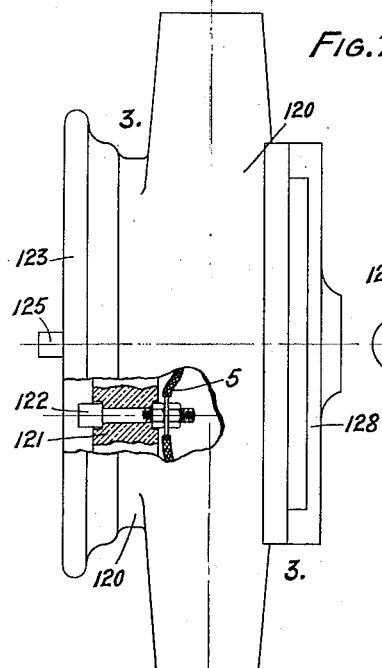
Figs. 7, 8, 9 and 10 show junction apparatus connected with the hand operated controller and other parts.
Figure 8:
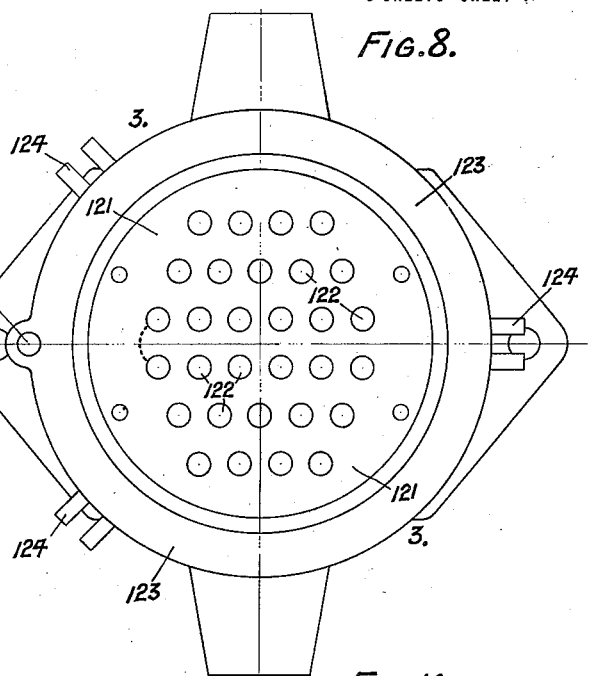

The electrical apparatus is, as stated, primarily of the kind in which the raising, lowering, sluing, luffing or equivalent mechanism of the apparatus is controlled and operated by a portable controller device, which is connected up with the various mechanisms, or with parts connected with them, through a flexible or jointed cable connection.

In the case illustrated, it is to be assumed that the raising or lowering and manipulating machine is a crane, in which a jib or equivalent part, and the machinery generally are adapted to revolve around a fixed pivot or central column, and the various wires connected with the terminals of the portable controller, and the various electrical parts of the machinery, are connected by wires with this central column or pivot, and to and from it the current is conducted to the different parts which revolve with the crane structure or machinery proper.

In the system, the current for operating the hoisting and lowering, and the sluing or luffing motors of the crane, and that which passes through the manually operated portable controller, and is employed to operate the various parts controlled thereby, are separate. That employed for the latter purpose is small in quantity, and of low voltage; while that employed for the main motor or motors and electrical contactors, is relatively large, and may in some cases, be of a relatively high tension. By this, the size and weight of wires and cable used in connection with the controlling parts, and the appliances or mechanisms used therein, would be relatively light and cheap, and not so liable to become deranged, and the use of them would not be dangerous to the users or operator.

Referring to the drawings, and more particularly to Fig. 1, 1 represents the hand operated portable or pilot controller; 2 is a contact plug device, having in it a plurality of contacts; 3 represents socket devices adapted to receive the contact plugs 2; and $2^x$ is the cable connecting the plug 2 with the controller; while 4 is the cable connecting the two socket devices 3. 5 shows the wires of the cable extending between the contact plug 3 and a column 6, which may be assumed to be the central stationary column or pivot of a crane, about which the jib or the like, and the machinery revolve, in the case of the machine being of the jib or like type.

On this stationary pillar or column 6 there are a series of metal rings 7, insulated from one another, and connected up with the wires of the cable 5; and operating in connection with these rings 7, is a series of contact brushes 8, carried from a part or carrier fixed to the crane machinery, which revolves around the column, and by means of which current is conducted through the various wires controlled by the controller 1.

10 is the armature of the raising and lowering motor of the crane or machinery, and 11 the field magnets of this motor. 12 are the resistances of this motor, which are cut in and out by switches $13^x$ as indicated, by electro-magnetic devices, preferably solenoids, 13, controlled from the controller 1; and 14 are electromagnetic devices, preferably solenoids, also controlled by the controller 1, which actuate the direction of movement switches of the motor. That is, the main controller of this motor consists of a series of switches, each worked by a solenoid or electromagnetic device, and adapted to cut out or in the starting resistances 12, in successive steps; and double pole switches worked by solenoids or electromagnets for controlling the direction in which the main motor shall run.

The windings of the solenoids or electromagnets 13 are energized through current received through the leads 15, connected as described with the portable controller 1; and the direction electromagnetic devices 14 are energized by the current conveyed through the leads 16, through the portable controller.

The action and effect of these solenoids or electromagnetic devices—all of which are energized by current from the small pilot or secondary circuit—are hereafter described.

With regard to the action and effect of the solenoids and switches 13, $13^x$, and 14, $14^x$, the function of the secondary or pilot circuit, and the action generally of the parts connected with these solenoids, the motor 10, 11, and the resistances 12, they are as follows:—

By the first manually effected action or movement of the portable control 1, in moving the movable contact from the "off" position when it is desired to raise the load, the making of the first contact causes a circuit to be made through the coil of one of the solenoids, 14, of one of the switches $14^x$, namely, the left hand one, and so this switch $14^x$ is closed, so that the motor is enabled to start in the lifting direction. This action however does not start the motor, as the circuit is not complete, and to complete it one of the switches $13^x$ has to be closed; and so that the whole resistance 12 shall be in circuit, the furthermost switch $13^x$ must be closed; and this closure is effected by throwing the handle of the controller 1, so that its movable contact comes on to the next contact from the "off" position, which contact is connected with the right hand solenoid 13, and so it is energized, and the first switch $13^x$ closed. By this action current passes through the field magnets 11, through a series relay solenoid 73, and thence to one end of the resistance 12; and to cut out the resistances so that the motor receives the full current, the handle of the controller 1 is moved around on to further contacts in it, connected with the other solenoids 13, so that when the last of these solenoids is energized, and the last switch $13^x$ closed, the resistance 12 is entirely cut out.

To enable however, the motor to start, the brake 30 has to be relieved entirely by the solenoid 32; and this is effected as hereinafter described, by the solenoid relay switch $73^x$ which as stated, is energized when a direction switch $14^x$, and the first switch $13^x$ of the resistance 12 are closed; as the current cannot pass until the latter action takes place. In this condition the motor will begin to raise the load, and when further resistances are cut out it accelerates the lifting.

To insure that this sequence of operations shall take place, there is used in connection with the solenoids 13 and 14, and switches $13^x$ and $14^x$, a set of interlocking switches 80, 81, which are closed and opened by contacts on or mechanically connected to the cores of the solenoids 13, and 14. Namely, current return wires from the solenoid windings 13 are connected to the main or general return conductor 100 of the secondary or pilot circuit; and the interlocking switches, 80, 81, are also connected up to this return 100; and thus it is necessary to enable the switches 14$^x$ to be operated, and the motor 10, 11, to be started, that all the switches 13$^x$ and 14$^x$, and the contacts of the solenoid cores or moving parts which actuate the switches 80, 81, should be down, that is not stuck up, or in their wrong positions. Provided therefore, these contact switches 80, 81 are all in their proper positions, and closed, and connected in series, then the starting of the motor can be effected, and the switches 13$^x$ will operate in sequence in the desired manner; and when the first or right hand switch 13$^x$ is closed by its solenoid 13, after the starting solenoid 14 has been operated, and the double pole switch 14$^x$ is closed, then the series relay switch 73$^x$ is operated as described, and the brake 30 lifted completely.

The main positive and negative current conductors are marked 20, 21, and the secondary current of smaller quantity above referred to, which is supplied to the various parts controlled by the controller 1, is provided by a generator such as a motor-generator or a similar type of apparatus. In the case shown, this generator is a motor-generator; of which 22, 23 are the armature and field magnet of the motor, 22$^x$ and 23$^x$ being the armature and field magnets of the generator; and 24 and 25 the supply and return conductors.

26 is an ordinary double pole switch; which when a crane or machine (or one of a series if a plurality exist) is used, is closed, and the main leads 20, 21, are connected up with the motor generator 22, 23, 22$^x$ 23$^x$; and obviously this motor generator must be started before the crane or apparatus can be used.

When the switch 26 is closed, current will pass by the wire 27 to the armature 22, and from thence through the resistance 28 back through the wire 29 to the return main 21; while on the other hand current from the wire 27 passes through the field magnet 23 of the motor 22 direct to the return wire 29, so that the field magnets are energized.

Under this condition the motor 22 will, in starting run at less than its full speed, and it cannot be subjected to overload in starting, being protected by the arrangement.

Current, however, can pass from the conductor 27 by the wire 50, to the solenoid or electromagnet 51, through the resistance 52 (the circuit of which is connected with the return wire 29, on the motor side of the resistance 28); and this solenoid acting on the switch 53 closes the circuit by way of the wire 54 with the return wire 29 direct (without passing through the resistances 28), and thus the full current can then pass, to the armature of the motor 22 after it has been started up.

The lowering brake is generally designated 30, and its operating lever 31, and this brake may be of any known suitable kind, and it is pulled off more or less, by the solenoid 32, the supply current to which is controlled by the portable controller 1, as stated. Current to this solenoid 32 is passed through the graduated resistance 33, and according to the particular stationary contact in the controller 1 which the particular movable contact parts of this instrument engage, when moved by its handle, the amount of the resistance 33 will be cut in and out. 35 are the wires to the resistance 33, and as more or less of the resistances are cut out, the brake will be removed more or less. A dash pot 36 is used in connection with this brake to render its action steady.

The graduated solenoid 32 is in the pilot or secondary circuit, and is controlled by the small controller, and it does two things, namely, by means of the series relay, 73, 73$^x$ the solenoid lifts the brake off (as the lifting motor starts), and it also lifts the brake off when lowering the load; so that this one solenoid does the whole duty of the brake.

In addition to the motor used for raising and lowering, there is or are those used for sluing, or luffing, or both; and these will be provided with somewhat similar resistances and solenoid for cutting in and out the resistances. One of these motors is shown on the right hand side of Fig. 1; and in this diagram, which may be assumed to be a sluing motor arrangement, the parts corresponding with those of the lifting and lowering motor diagram, are marked with the same figures of reference, with the added letter "a". The brake of this sluing gear is designated 40, and it is operated through a solenoid 41, to which current is supplied through a wire 42 from the controller 1 and its connections. In operating the motor 10$^a$, 11$^a$, and its mechanism, from the controller 1, the first contact from the "off" position, which the movable part of it is moved into, frees the brake 40.

With regard to the current of the pilot or secondary circuit, this as stated is supplied by the motor generator 22, 23, 22$^x$, 23$^x$, and will always be relatively small, to that of the main circuit; and if the main circuit voltage is more or less high, the voltage of the pilot circuit will be lowered. For instance, if the current to the motor be 75 amperes and 500 volts, the secondary or pilot circuit might be only an amperage of about .25, and its voltage would be less, say 220 volts.

The supply of current from and to the main conductors 20, 21 to the raising and lowering motor 10, 11, and the resistance 12, and its switch, is controlled by the double pole switch 60, which is actuated by a solenoid 61, governed and controlled from the portable controller 1 through the wires 62. The part of or on the controller 1 which opens and closes the circuit of this solenoid 61, is the emergency switch 65. That is, current passes from the generator $22^x$ $23^x$ through the wire 24 to the switch terminals of the switch 65 (which is normally closed) in the controller 1; and thence by the wire 62 to the solenoid 61, so that this switch 60 if open, can be closed by closing the switch 65; the current from the generator $22^x$ $23^x$ passing to one of its terminals, and thence via the bridge of the switch, to the other terminal, and thence to the solenoid 61.

With regard to the emergency switch 65 of the controller 1, assuming it is normally closed, then in the event of any emergency whatever, the operator can by simply striking the head $65^x$ of this switch, open the circuit controlled by the controller 1, inasmuch as the current from the generator $22^x$ $23^x$ passes to the controller by one of the terminals 66 of this switch; and so, if this switch 65 is out of contact with this terminal, no current can flow to the pilot system controlled by this controller 1, and the whole system is off, and safe, and the machinery is all stopped; while the brakes 30, 40 will be on.

The switch 60 will have connected with it means by which it is opened by an overload, when it takes place; but which at the same time will not pull down the core of the solenoid, 61, which is connected with and operates this double switch; so that the core remains in the position in which it stood before the overload took place; and the apparatus is so arranged that afterward by opening the switch 65, the solenoid 61 will fall or move; and then afterward by closing it, the solenoids would be again moved in the opposite direction, and close the switch 60.

A device of this character is shown in Fig. 11; and in this case, connected with the core 67 of the solenoid 61, there is a toggle connection 68; and in line with the central joint of this toggle, there is a solenoid winding 69 in the wire 70 leading from the main 20 to the motor 10, 11; and the core 71 of this solenoid will normally fall, say by gravity, to a lower position; but when an overload comes on, the extra current passing through the winding 69, forces the core 71 along, which will strike the joint of the toggle 68, and so open the switch 60 and main circuit, and in this action the core 67 will have remained in position, so that the switch 60 remains open; and it is closed from the controller 1 by first opening the switch 65 which releases the core 67, so that the toggle 68 comes into line with the core 67; and then by closing the switch 65, the current passes through the solenoid 61—having been cut off—and so the switch 60 is again closed from the controller.

With regard to the switch portable controller 1, in the case shown this instrument is arranged and combined so as to serve to control and actuate the hoisting and lowering motor or sluing motor, and the luffing motor.

This instrument is illustrated in Figs. 2 to 6, and in the case shown 85 may be assumed to be the lowering and raising portion; the portion 86 is for the sluing part of the mechanism or machinery, and 87 is the luffing controller portion. All these separate mechanisms have separate actuating handles and levers 88, by which the movable contact part of each portion is controlled.

The movable contact part consists of a metallic ring 89 fixed on the spindle 90, which has a threaded part 91 in it working on the internal threaded neck 92 in the casing 93, so as to make a good or air tight joint. On this ring 89 there is a spring metal part 94 which works between the plates 95 carried on arms 96 fixed on an insulating ring 97, fastened in the case 93; and to the strip or arm 96 current is supplied to the instrument. From the spring plate 94 current passes to two blow-out electromagnets 98 carried on the ring 89, and moving with it; and from one of these magnets it passes to a segmental brush plate $100^x$, fixed on an insulating block 101; and the poles of the magnets 98 are opposite to the ends of this contact plate $100^x$, so that when sparks are made when the contact $100^x$ is moved over the stationary contacts, they are blown out by the electromagnets. An insulated strip or flange 102 is fixed in the periphery of the wall 89, which shields the outer ends of the electromagnets 98; and the casing of the instrument is protected by providing it with a thin insulating lining 130.

The stationary contacts are marked generally 103, and are fixed to the stationary ring 97; and they each consist of a metallic carrier part 104, fastened by a screw stem and nuts 105, on the ring 97; a contact arm or part 106 pivoted at 107 in the carrier 104, and having a contact roller 109; and springs 108 normally pressing these pivoted arms or parts 106 toward the axis of the instrument.

Current is conveyed to and from the contacts 103 by wires from the cable $2^x$, and connected up with the connections 105; and it passes to these wires from the segmetal wiper or brush $100^x$ in the ring 89, as this part is moved around by its handle 88. The springs 108 will always keep the contact rollers 109 firmly in contact with the contact wiper $100^x$.

A diagram of the instrument 1 is shown in Fig. 6, in which on the left hand side is illustrated the various contacts connected with the main hoisting and lowering motor, and parts in the main circuit connected with it.

With regard to the left hand part of the diagram, the spots on the left hand side, from the bottom upward represent the various contacts for operating the direction solenoid switches 14$^x$, and the resistance solenoid switches 13$^x$ the first at the bottom being connected with the motor switch 14$^x$ for lifting; the last, at the top is connected with the reversing solenoid switch, and that contact immediately adjacent toward the right for supplying current through the first resistance switch 13$^x$ of the resistance 12.

On the right hand of this left hand portion of the diagram, are shown the various contacts for cutting in and out the resistances of the main brake solenoid resistance 33. In this diagram it will be seen that the current is led by one wire to one terminal 66 of the switch bar of the emergency switch 65; while the other terminal 66 is connected to the supply arms 96 of the controller instrument 1, so that current is only supplied to this instrument, and the system, when the switch 65 is closed; while when it is opened on emergency (and this can be very suddenly done by the operator) the current is cut off from the apparatus or controller, and the whole system in the manner above described.

The right hand side of the diagram, shown in Fig. 6, represents a diagram of the controller part for operating in connection with the sluing machinery of the crane.

With regard to the instrument 87, as shown this has two handles 88, so that it can be operated from either side.

The emergency switch 65, is spring pressed to closing position and is opened by the operator striking the cap 65$^x$ of such switch, when the emergency requires such operation.

With regard to the multiple contact plug device 2, and the sockets 3, these are shown in detail in Figs. 7 to 10.

Figure 9:
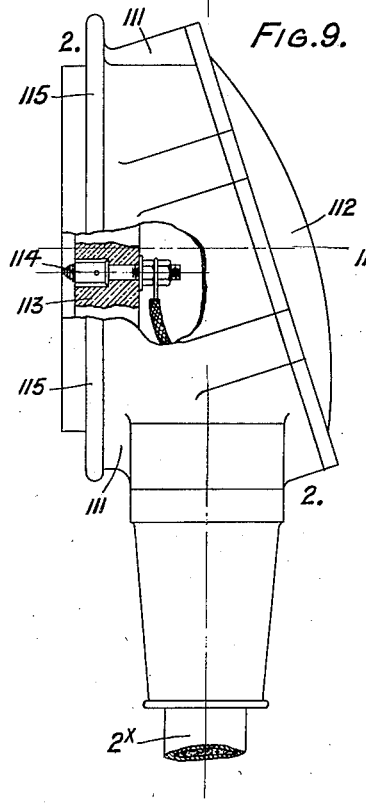
Figure 10:
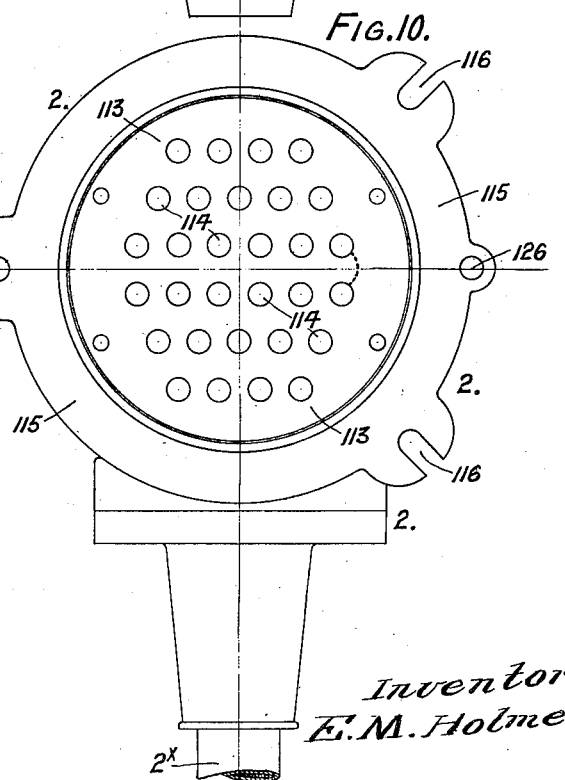

The plug construction shown in Figs. 9 and 10 consists of a box 111 having a cover 112 at its back, and a face wall 113 of insulating material, in which are fitted a multiplicity of contacts 114 all of which are insulated from one another, and each is connected up with one of the wires of the cable 2$^x$.

The contacts 114 each consist of a volute spring, the convolutions of which project beyond the face of the wall 113, and are of conical form, as shown in Fig. 9.

The box 111 has a flange 115 with gapped lugs in it, for receiving fastening bolts.

The sockets 3 consist of a case 120 with an insulating wall in the face 121, carrying metal contacts 122 each connected with a wire of the cable 2$^x$ by studs passing through the insulating wall 121. The arrangement of these contacts is the same as that of the contacts 114.

The case 120 has a flange 123 with projecting lugs 124 corresponding with the lugs 116; and when the plug 2 is placed on the socket 3, and registered by means of a stud 125 on 3, passing through a hole 126 in 2, all the contacts make proper contact; and the two parts are fastened together by hinged stud bolts hinged on 124, and wing nuts, which swing into the gapped lugs 116.

By means of the form of contact described a simple and effective contact is obtained between all the contacts 114 and 122, and this is accomplished without a great refinement of fitting and adjustment. The socket 3 has a cover 128 on the back of it.

By this arrangement one controller can be used to operate the machine from different floors, holds or the like.

In connection with the system limit switches 135 are employed which are adapted to be operated when the lifting rope, chain or the like has reached the limit either in the lifting up, or lowering direction.

These limit switches are of the self setting type, and are placed in the pilot circuit system; and they are employed in the line which are connected with the windings of the solenoids 14, which control the operation of the motor 10, 11 in either direction. By employing these limit switches in this pilot or secondary circuit having the small current and low tension, switches of a small and very inexpensive construction can be employed, and therefore economy of cost is accomplished.

The limit switch on the lifting solenoid switch 14 conductor will be opened in the known way when the limit of winding is reached; while the other on the wire of the reversing or paying out direction solenoid switch 14, will be opened when the limit of paying out of rope or chain is effected; and, as stated, after one switch has been opened, and the motor moves in the opposite direction to which it has been moving—which can be done by the arrangement shown—this switch so opened, resets itself in the known way.

In the case of the application of the invention to raising and lowering machinery in which a winding barrel is adapted to be connected up with and disconnected from the driving motor or machinery, through a clutch, there is employed in connection with the controller 1, a circuit opening and closing device by which the clutch is actuated or controlled; and this circuit opening and closing device works in connection with, and is controlled by, and controls, the actuating handle 88 of the controller. This mechanism is illustrated in Figs. 12 and 13.

In electrically operated raising and lowering machinery of this kind, the clutch referred to is moved into gear by the action of a solenoid 117, on a circuit 118, one conductor of which is connected with one of the stops 66 of the emergency switch 65. In the case shown this circuit controlling device consists of a lever 119, (part of which is outside the controller case), connected with a switch plug 130 in the circuit 118; and the upper end of this lever 119 works in connection with a groove 131 in the boss of the handle 88; and this groove extends outward from the handle boss on the inside of the handle 88 as shown. When the switch 130 is closed, the lever 119 stands out in the end position; and the metal above the groove 131 of the handle will then lie above a crooked or enlarged end of the lever 119, which works in the groove; and, consequently, the handle 88 cannot be moved downward (the downward movement being used for the lowering operations of the machinery). Therefore, when the circuit 118 is closed, the clutch will be pulled into engagement with the winding barrel; and the winding barrel will then be geared up with the raising motor of the machinery. The handle 88 is then free to be moved up for operating the raising motor, but prevented from being moved downward.

When however, it is desired to lower the load, the lever 119—the vertical part of which is outside the casing of the controller 1—will be pulled in by the hand to the position shown in dotted lines, so that its crook or enlarged end will lie in the circular part of the groove 131. In this position the circuit 118 is open, and the clutch will be out, being pulled out by a weight or spring; and then in this position the handle 88 can be moved downward, but it cannot be lifted, as the detent or crook of the lever 119 will then stand over the metal part 133 extending across the groove 131. When after lowering, the handle 88 is moved to the neutral, that is the horizontal position, the lever 119 automatically moves outward, being actuated by a spring 132, and the clutch is thrown into engagement.

What is claimed is:—

1. An electrical crane including a raising motor, a stationary crane column, electromagnetic devices for controlling the motor, a main circuit for energizing the motor, a pilot circuit for controlling the electro-magnetic devices, contact rings on the column forming the terminals of the pilot circuit, a portable controller, and connections leading from said controller and having movable engagement with the contact rings to electrically connect said rings with the controller.

2. An electrical crane including a raising and lowering motor, electro-magnetic devices for controlling said motor, a main circuit for energizing the motor, a sluing mechanism and motor, a brake for said latter motor, a pilot circuit for governing the raising and lowering motor, electro-magnetic devices, sluing mechanism and motor and brake therefor, and a portable controller selectively controlling the pilot circuit to govern the respective motors, electro-magnetic devices and brake, whereby the current can be cut off from the sluing motor, to permit the crane to travel under its own inertia, the brake being independently governed to control such travel at will.

3. An electrical crane including a series of independent mechanisms, a pilot circuit for controlling said mechanisms, a plurality of contact socket devices each having a plurality of contacts for properly directing current through the pilot circuit to the independent mechanisms, a portable controller, a series of connectors leading therefrom, and a movable contact device having a series of contacts in circuit with the connectors, the contact device being adapted to be connected with any one of the socket devices to independently establish connection between the portable controller and the pilot circuit.

4. An electrical crane including a raising and lowering motor, a main circuit for operating the motor, a switch in the motor circuit, a pilot circuit, means governed by the pilot circuit for operating the switch, an overload circuit breaker for breaking the switch without interfering with the pilot circuit controller, and a manually operable emergency switch for governing the pilot circuit control.

5. In an electrical crane, the combination of a main motor circuit; a motor; a multiple resistance in series with the field magnets of the motor; switches for cutting in and out said resistances; electromagnetic devices adapted to operate the switches; a controller adapted to control the action of the electromagnetic device; a brake connected with the motor; an electromagnetic device for operating the brake; a switch for opening and closing the circuit of the brake electromagnetic device; and an electromagnetic device for operating the latter switch in series with the motor resistance and field magnets substantially as described.

6. In an electrical crane, a main circuit, a lifting motor in said circuit, a secondary or pilot circuit, a controller in the latter circuit, switches in the main circuit connected with the leads of the motor for supplying current in opposite directions to same, electro-magnetic devices on the secondary circuit for operating these switches, current to which is controlled by the controller, and a separate motor on the primary circuit for sluing having connected with it resistances, and switches on said resistances, operated by electro-magnetic devices on the secondary circuit, a brake, an electro-magnetic device connected with said brake for operating it, and in the secondary circuit, and a portable controller, the brake being adapted to be applied and taken off, and the motor to be started and stopped, so that in sluing after starting, the action can be free, but controlled by the brake, substantially as set forth.

7. In an electrical crane, a portable controller, an actuating handle, a handle locking and releasing lever adapted for a plurality of positions, and in each position to prevent movement of the handle in one direction, a circuit, a solenoid in said circuit, a switch in the circuit, and a connection between said lever and switch.

8. In an electrical crane, a portable controller, an actuating handle therefor, an additional handle, said additional handle being formed with an interrupted annular groove, a recess formed in the handle and communicating with the groove, a lever having a part operative in the groove and capable of passage through the recess, a circuit, a switch, and a clutch actuating solenoid.

9. An electrical crane including a raising and lowering motor, a main circuit for operating the motor, a pilot circuit for materially less current than the main circuit, a brake for the motor, an electro-magnetic device on the pilot circuit for controlling the brake, a series switch in the pilot circuit for controlling current to the said brake magnetic device, an electro-magnetic device in the main circuit for controlling said switch, and a portable controller for governing the pilot circuit; substantially as set forth.

10. An electrical crane including a raising and lowering motor, a main circuit for operating the motor, a pilot circuit for materially less current than the main circuit, a brake for the motor, an electro-magnetic device on the pilot circuit for controlling the brake, a series switch in the pilot circuit for controlling current to the said brake magnetic device, an electro-magnetic device in the main circuit for controlling said switch, a portable controller for governing the pilot circuit, a series of resistances in the pilot circuit adapted to be controlled from the portable controller, whereby the said brake electric device is energized to a variable degree for releasing the brake; substantially as described.

11. An electrical crane including in combination, a motor, a motor brake, a main circuit for operating said motor, a pilot circuit, a series of controlling devices for said motor governed through the pilot circuit, a portable controller governing and selectively actuating any of said controlling devices, an electric device adapted to release the brake to a variable degree, and resistances in the pilot circuit adapted to govern the said degree, substantially as described.

12. An electrical crane including in combination, a motor, a motor brake, a main circuit for operating said motor, a pilot circuit, a series of controlling devices for said motor governed through the pilot circuit, a portable controller governing and selectively actuating any of said controlling devices, an electric device adapted to release the brake to a variable degree or wholly, resistance in the pilot circuit adapted to govern the said degree, and a relay adapted to operate automatically the brake controlling electrical devices, so as to release the brake when current is passed through the motor; substantially as described.

In testimony whereof I have signed my name to this specification in the presence of two subscribing witnesses.

EDWARD MORTEN HOLME.

Witnesses:
ERNOLD SIMPSON MOSELEY,
MALCOLM SMETHURST.